Figure 1:
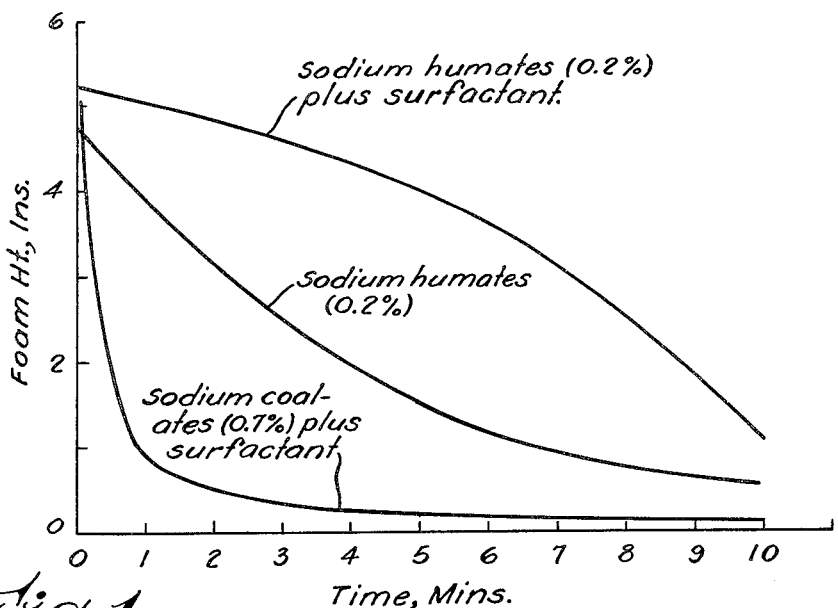

INVENTORS.
Jack F. Mills
Charles K. McAnallen
Robert S. Montgomery 3,053,763
FOAM STABILIZERS
Jack F. Mills, Charles K. McAnallen, and Robert S. Montgomery, Midland, Mich., assignors to The Dow Chemical Company, Midland, Mich., a corporation of Delaware
Filed Oct. 2, 1959, Ser. No. 844,035
3 Claims. (Cl. 252—6.5)

This invention relates to novel stabilizing agents for foams that have been produced by the internal chemical generation of a gaseous component. More particularly, it relates to such stabilizing agents in foamed fire extinguishing compositions.

Foams produced by the generation of a gaseous component within the body of a foamable mass are commonly referred to as "chemical" foams. Such foams have a variety of important industrial uses, the most important of which is their utility in the control of fires. As indicated by J. H. Bikerman in his work entitled "Foams: Theory and Industrial Application," Reinhold Publishing Co., N.Y. (1953), such foams are commonly generated from aqueous solutions or dispersions of foamable materials as the result of the formation in such solution or dispersion of an effervescing gas that functions as a blowing agent. The formation of such gas is, of course, brought about by the chemical interaction of certain components incorporated in the foamable material. Such chemical interaction is well exemplified by that taking place in the ordinary sodium bicarbonate-aluminum sulfate type of fire extinguisher.

For practical utility it is not enough merely to produce the desired foam. For example, the chemical interaction in solution of aluminum sulfate and sodium bicarbonate gives extremely rapid rise to a foam structure. However, the foam so produced is markedly short-lived, tending to collapse immediately after formation. In applications where the foam structure is either desirable or necessary, such foams would be of no practical value.

To overcome this and to provide a relatively long-lived, stable foam, it is usual to add to foamable compositions stabilizing ingredients that are effective to increase the life of the foam provided. A variety of such stabilizing ingredients are known and have been employed. The above-cited treatise by Bikerman, for example, and articles to be found in Industrial and Engineering Chemistry, vol. 18, No. 11 (November 1956), pages 2012–2051, discuss certain of these stabilizing materials. By way of specific example, saponin has been disclosed in U.S. Patent 1,507,943 as an effective stabilizer for foams produced by the aluminum sulfate-sodium bicarbonate fire extinguishing system. Also, certain licorice root extracts have been commonly used for this purpose.

However, both saponin and licorice root extracts are relatively expensive materials. Thus, despite their general usefulness, it would be decidedly advantageous to provide novel, effective and economical stabilizers for aqueous, foamable compositions.

The provision of such stabilizers constitutes the chief aim and design and the principal object of the present invention.

Another object of this invention is to provide useful, aqueous, foamable compositions that contain such economical and effective stabilizers and that provide long-lived stable foam structures.

According to the present invention, certain complex acids that may be obtained from the oxidation of coal and similar carbonaceous substances (hereinafter generally referred to as humic acids) are used as the stabilizing agent in aqueous foam-providing compositions. More narrowly, the invention contemplates the use of the soluble ammonium and alkali metal salts of these insoluble humic acids as effective stabilizing agents.

In the practice of the present invention, insofar as it relates to the stabilizing of foams produced by acid-sodium bicarbonate fire extinguishing systems, the humic acid salts stabilizing agents are admixed with the sodium bicarbonate solution of such system and may constitute from about 1 to about 20 percent of the dry weight of the bicarbonate. Advantageously, between about 3 and 8 percent of the stabilizer is employed. Small quantities of the present stabilizing materials are highly effective in imparting to chemically generated foams the desired stability. When excessive amounts of stabilizing agents are employed, foams of such excellent stability and thickness may be obtained that their flowability may actually be impaired and the foam rendered undesirable for certain purposes.

In utilizing the stabilizing compositions of the present invention, the use of insoluble free humic acids must be avoided. To be effective these stabilizing agents must be employed as the soluble salts of the humic acids and maintained in such soluble state until actual formation of the desired foam. To ensure this, it is preferable for the humates to be dissolved in the sodium bicarbonate solution of the acid-sodium bicarbonate type of fire extinguisher, rather than in the acidic solution employed in combination therewith. In an acid solution the humates would be precipitated as the insoluble free acid and would be thereby rendered substantially ineffective. In the case of aluminum sulfate solution, which is frequently employed as the acidic component, addition thereto of the humates would result in the precipitation of insoluble aluminum salts.

The oxidation of coal and similar carbonaceous materials to produce complex mixtures of acidic bodies is well known. Such oxidation gives rise to both soluble and insoluble acids. The humic acids are the insoluble acid portion of such an oxidation reaction product.

The soluble acids, as distinguished from the humic acids, are generally known and referred to as coal acids. For convenience, their salts will be referred to herein as coalates.

Commonly, the oxidation of coal and other carbonaceous materials is carried out by treating the carbonaceous material with oxygen in the presence of caustic soda (or equivalent alkali material) at elevated temperatures (frequently in the neighborhood of 200° C.) and under pressure of air or oxygen gas, oftentimes in the range of from about 1000 to about 2000 p.s.i. The resulting oxidation reaction product consists of a soluble salt (usually the sodium salt when caustic soda is employed) of insoluble humic acids, the analogous salt of the soluble coal acids, and sodium or the like carbonate, depending on the particular strong alkali employed for the conversion. Because of the difference in solubility of the free humic acids and the free coal acids, it is possible to separate the two classes of compounds by acidification of the oxidation reaction product.

For purposes of practicing the present invention, such separation and subsequent purification are not necessary. The crude reaction mixture containing the salts of the humic acids provides excellent stabilizing action. Its use in foamable compositions suitably permits the formation of stable, long-lived foam structures.

Since involved processing of the oxidation reaction mixture is not requisite, manifest economy in the production of efficient foam stabilizing compositions is made possible. The humic acids involved in practice of the present invention are mixtures of acidic bodies of well-known character and identity. Despite this, little is known about the actual chemical identity of the constituent parts of the humic acids mixture. While great variations may occur in specific instances, the average molecular weight of typical free humic acids may be as low as 200 to 300 and as high as approximately 3000 and even higher. Any given value, of course, depends in large measure on the method employed in determining the subject property.

Among other sources, the humic acids are comprehensively described in the Illinois State Geological Survey Report of Investigations 207, "Oxidation of Coal," by G. R. Yohe.

Thus, as is apparent, the humic acids may be broadly defined as amorphous solids which generally are dark brown or black in color. They are almost totally insoluble in water, but dissolved readily in aqueous ammonia and in aqueous solutions of the alkali metal hydroxides and carbonates. Their equivalent weight is generally in the range from about 250 to about 300. The acidic character of the humic acids is due to the presence of both carboxyl and phenolic hydroxyl groups in their molecular structure.

The above mentioned coal or the like alkaline oxidation reaction which provides the soluble humic acid salts in admixture with the salts of the soluble coal acids can be controlled so that the humates constitute the predominate product. Soluble humic acids salts are also obtained by the extraction of lignite and lignite-like coals with caustic solutions. Coal that has weathered or otherwise undergone partial oxidation falls within the definition of lignite-like coals.

The invention is further illustrated in and by the following examples wherein, unless otherwise indicated, all parts and percentages are on a weight basis.

*Example 1*

Soluble humic acids salts were obtained substantially free from the soluble coal acids salts. Acidification of a solution of the alkaline reaction product resulting from the oxidation of coal in the presence of sodium hydroxide brought about the precipitation of the insoluble humic acids. The precipitate was washed and then redissolved in a solution of sodium hydroxide. Evaporation of the water from the resulting solution gave the sodium salts of humic acids in dry form.

A two and one-half gallon portable fire extinguisher was charged with the following solutions.

Charge "A1" (inner chamber): Grams
    Aluminum sulfate _____ 850
    Water _____ 1000
Charge "B1" (outer chamber):
    Sodium salts of humic acids _____ 40
    Sodium bicarbonate _____ 800
    "Dowfax 2A1" [1] _____ 3.5
    Water _____ 6600

[1] "Dowfax 2A1," a surfactant material manufactured by the Dow Chemical Company, is the sodium salt of disulfonated dodecyldiphenyl oxide.

Into a steel box measuring 32 x 32 x 12 inches, gasoline was poured to a depth of one inch. The gasoline was ignited and permitted to burn for 15 seconds. The charged fire extinguisher was them inverted and the stream directed on the far side of the box at a distance of about ten feet. In only 29 seconds, the fire was extinguished, with about four inches of foam covering the gasoline. A control using a commercially available fire extinguisher charge required about 40 seconds to extinguish an equivalent fire.

*Example 2*

Following the procedure of the first example, the two and one-half gallon portable extinguisher was charged with the following solutions.

Charge "A2" (inner chamber): Grams
    Aluminum sulfate _____ 850
    Water _____ 1000

Charge "B2" (outer chamber):
    Mixed, humic-acids, containing polycarboxylic acids salts _____ 150
    Sodium bicarbonate _____ 700
    "Dowfax 2A1" _____ 3.5
    Water _____ 6600

The mixed, humic-acids-containing, polycarboxylic acids salts employed in charge "B2" were the product of the oxidation of coal in which the humic acids, as the sodium salts, were admixed with the salts of the soluble coal acids and with sodium carbonate. No purification or separations of the humic acids was attempted. The composition of the 150 gram charge of these mixed salts was as follows:

Grams
Sodium salts of humic acids_____ 12
Sodium salts of soluble coal acids_____ 33
Sodium carbonate_____ 105

Using the same test procedure described in Example 1, the fire was extinguished in only 30 seconds with the foam generated from mixture of charges "A2" and "B2."

A comparison of the data in Examples 1 and 2 indicates that purification of the reaction product resulting from coal oxidation to effect separation of the humic acids from the water soluble coal acids is not necessary. This as is plainly apparent, is of significant economy since it allows use of inexpensive compositions well adapted to provide a high degree of foam stability.

In both of the immediately preceding examples a surfactant was employed, as exemplified by the inclusion in each foamable composition of a minor amount of "Dowfax 2A1." While the use of neither this no any other surfactant constitutes a part of the present invention, it is to be noted that a certain advantage derives from their use in conjuncion with the improved foam stabilizers of the invention.

Figure 2:
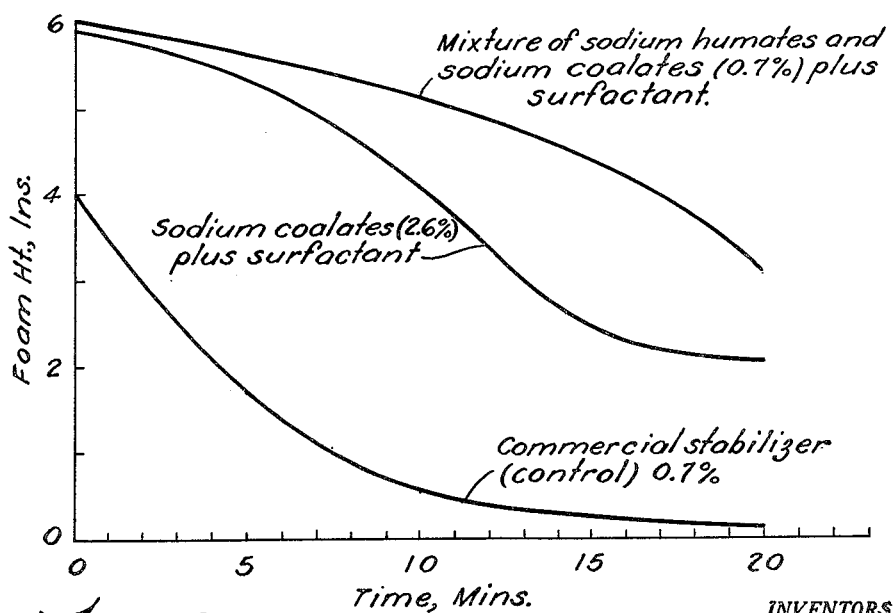

In conjunction with the above comparison of the data in Examples 1 and 2, reference is made to the graphs in FIGURES 1 and 2 of the accompanying drawing. In FIGURE 1, the relative stability of foams produced from identical foamable compositions, but containing different stabilizing agents, is illustrated. It is to be noted that the stabilizing agents compared were obtained from a coal oxidation reaction product by a process of fractionation to give the insoluble humic acids substantially free of the soluble coal acids and the coal acids in turn substantially free of the insoluble humic acids. Acidification of the alkaline coal oxidation reaction product brought about the precipitation of the humic acids which were washed free of soluble material, converted to their sodium salts, and dried. Extraction of the acidified reaction mixture with the proper solvent, as for example, methyl ethyl ketone, permits the separation of the free, water-soluble coal acids.

In FIGURE 1 the foam stabilized with soluble salts of humic acids (i.e., humates) is seen to be significantly more stable than that stabilized with the coalates (i.e., the salts of soluble coal acids). This both in relation to the rate of foam collapse and the fact that the humates stabilized foam maintains a substantial degree of its original structure at a time when the coalates-stabilized material has effectively totally collapsed. In addition, as is portrayed in the graph of FIGURE 1, significantly less of the humates is required to give this excellent stability than is required of the coalates, which produce markedly inferior foams.

In this connection, it should be noted that the percentage of stabilizer refers to the amount contained in the bicarbonate solution which is the solution contained in the outer chamber of the ordinary commercial fire extinguisher of the aluminum sulfate-sodium bicarbonate type.

It is evident that in Example 2 above the desirable results obtained are due in large measure to the humates content of the humic acid salts-containing polycarboxylic acid mixture that was employed.

In FIGURE 2 there are graphically compared the behavior of these foams. As therein identified, one of the foams contained a commercial stabilizer, another contained coalates substantially free of humates, and the third contained a mixture of humates and coalates.

Significantly larger amounts of stabilizers were employed here than were employed in the examples illustrated in FIGURE 1. Thus, as might be expected, foams of greater stability were obtained from both the coalate and the humate stabilized compositions. Nevertheless, it is evident that even at a smaller stabilizer content, foams containing the humate salts are superior to those stabilized with coalates.

Inspection of FIGURE 2 indicates the superiority of the humate stabilized foams over the coalate stabilized compositions, both as to rate of collapse and as to percentage of original thickness at the end of an arbitrarily fixed period of time.

The effect, referred to above, of the inclusion of surfactant with the foam stabilizers of the present invention, is graphically portrayed in FIGURE 1. Therein, in addition to curves illustrating the stability of foams produced in Examples 1 and 2, both of which were obtained from compositions containing "Dowfax 2A1," there is also set out a curve for the stability of a foam derived from a composition similar to that of Example 1 but containing no surfactant.

Analysis of the data graphically portrayed in FIGURE 1 gives additional support to the marked superiortiy of the humates over the coalates as foam stabilizers. Even in the absence of surfactant content, the humates of the present invention produce foams having a significantly slower rate of foam collapse than do foams containing coalates combined with surfactant as the stabilizing ingredient. The additional foam stability lent by the inclusion of surfactant in the humates-containing composition is also immediately apparent. As above stated, inclusion of surfactant forms no part of the present invention, but the practical value of such inclusion will be evident to those skilled in the art.

What is claimed is:

1. As a component of a foam generating charge for a chemical fire extinguisher, an alkali metal bicarbonate having admixed therewith an amount of soluble salts of the water insoluble acid fraction of the reaction product resulting from the partial oxidation of coal equal to from about 1 percent to about 20 percent by weight of the weight of said bicarbonate.

2. A composition as defined in claim 1, wherein the said soluble salts are present to the extent of from about 3 to about 8 percent by weight of the weight of alkali metal bicarbonate.

3. A stabilized foam-providing composition consisting essentially of water in which there is dissolved (1) an alkali metal bicarbonate which is adapted to react with an acidic substance in order to be formed into a foam structure and (2) soluble salts of the water insoluble acidic fraction of the product resulting from the partial oxidation of coal, said soluble salts being present in an amount equal to from about 1 percent to about 20 percent by weight of the weight of the alkali metal bicarbonate.

References Cited in the file of this patent

UNITED STATES PATENTS

| | | |
|---|---|---|
| 2,166,008 | Holter | July 11, 1939 |
| 2,250,182 | Goodner et al. | July 22, 1941 |
| 2,258,587 | Goodner | Oct. 14, 1941 |
| 2,405,538 | White | Aug. 6, 1946 |
| 2,529,211 | Busse et al. | Nov. 7, 1950 |

OTHER REFERENCES

Ostwald et al.: "Ueber Schaumfahigkeit und Oberflachenspannung, insbesondere von Humussolen," Kolloid-Zeitschrift, 1925, vol. 36, pages 342–351.